UNITED STATES PATENT OFFICE.

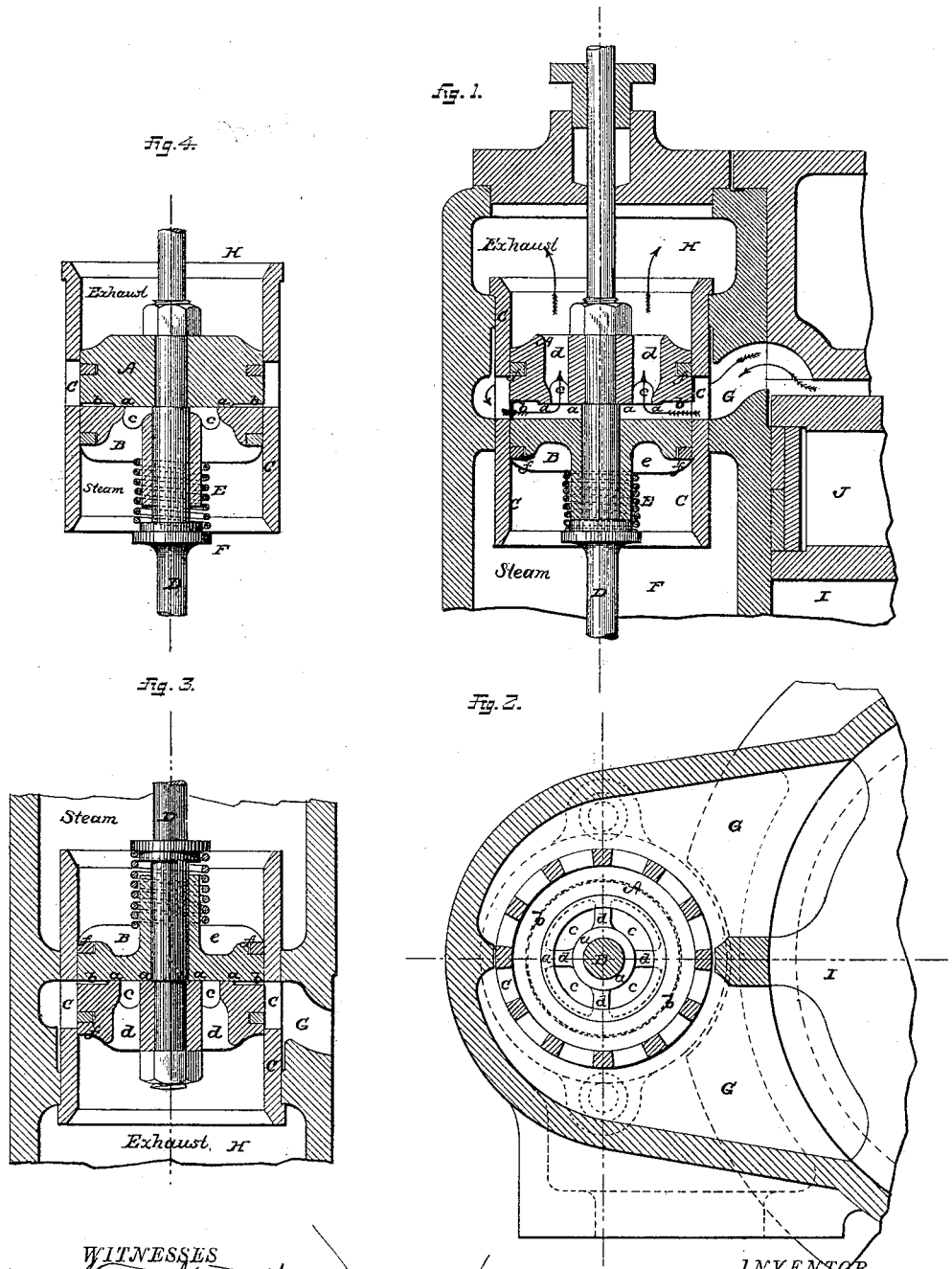

JOHN WARREN SARGENT, OF SCRANTON, PENNSYLVANIA.

PISTON-VALVE.

SPECIFICATION forming part of Letters Patent No. 332,113, dated December 8, 1885.

Application filed August 10, 1885. Serial No. 174,001. (No model.)

*To all whom it may concern:*

Be it known that I, JOHN WARREN SARGENT, a citizen of the United States, residing at Scranton, in the county of Lackawanna and State of Pennsylvania, have invented certain new and useful Improvements in Piston-Valves for Steam-Engines; and I do hereby declare the following to be a full, clear, and exact description of the invention, such as will enable others skilled in the art to which it appertains to make and use the same.

My invention relates to improvements in piston-valves for steam-engines; and the object of the invention is to so construct the valve that in addition to its office of distributing steam to the cylinder of the engine it will also act automatically as a relief-valve to free the cylinder from any excessive or dangerous pressure of water or steam. This object is attained by the construction hereinafter described, the essential features of which are a valve composed of two parts or sections, one fixed and one loose upon a common valve-stem held in contact and operating as one valve under the usual conditions, but adapted to be separated by pressure in order to open a passage for the escape of steam and water through passages in the valve itself.

In addition, various details of construction are included in my invention, which will be fully hereinafter described, and specified by claims.

The invention will be better understood by reference to the accompanying drawings, in which Figure 1 is a horizontal longitudinal section of a portion of the cylinder and steam-chest and valve at the front end of the cylinder, showing my improved valve operating as a relief-valve. Fig. 2 is a cross-section of the steam-chest, taken through the port. Fig. 3 is a section similar to Fig. 1, but showing the valve at the back end of cylinder in its normal position. Fig. 4 represents a modified form of the valve.

The letter I represents the cylinder of a steam-engine, and F the steam-chest, both of which may be constructed in the usual or any desired manner.

G is the port, leading from the cylinder to the valve-seat.

K represents the valve-seat, which is a cylindrical metallic bushing forced into the valve-chest, and rigidly secured therein. It is provided with numerous openings, c, Fig. 2, which register with the port G. The valve A B, which slides freely within the bushing K, is mounted upon the valve-stem D, the latter being operated in the usual way by an eccentric. This valve is composed of two parts. The part A is secured rigidly to the stem by means of a central hub, g, which is connected to the annular outer ring that bears on the seat by webs d. Spaces c' are thus formed in the part A, between the hub and outer ring, which open into the exhaust-space H. Packing-rings l l are inserted between the valve and its seat, as shown. The part B of the valve is composed of a solid head, having a plane face adapted to bear against ground joints a a at the end of part A, and an extension, m. It is fitted loosely upon the stem, but is capable of a limited sliding motion thereon against the pressure of a spring, L, which surrounds the extension m, and bears upon a shoulder, n, on the valve-stem. The pressure of this spring forces the part B against the ground faces a a, making a steam-tight joint, and under ordinary conditions the two parts of the valve operate as one in the usual manner. The part B is stiffened by webs e e, against which the free end of the spring bears, and which also retains in place the packing-rings o o. An offset, b, is formed in the face of the valve A, which, when the parts A and B are in contact, leaves an annular space of about one-sixteenth of an inch between the two sections, extending from the valve-seat to the shoulder formed by the offset mentioned; and while the area of this space is not sufficient to materially increase the clearance of the cylinder, it permits sufficient steam to enter to act upon the face of valve B as far inward as the tight joint a. The area of the surfaces bounding this space is about equal to half the area of the whole surface of the valve.
Under ordinary circumstances the pressure on the steam side of the valve, combined with that of the spring, is sufficient to overcome the pressure in the annular space b, and to keep the valve B up to its place. When, however, the pressure in the cylinder becomes twice as great as that in the valve-chest, the valve B will be lifted from its seat *a*, and will permit the confined steam or water to escape through the passages *c* and into the exhaust-space H. This condition is illustrated in Fig. 1, in which the piston J is reaching the end of its stroke and the separation of the valves A B has taken place automatically. After the pressure is relieved, the steam-pressure and spring immediately close the valves.

In the modified form shown in Fig. 4 the relief-passages are in the loose part of the valve, while the escape of water is through such passages into the steam-chest instead of the exhaust-passage. The practical operation, however, is the same as in the form first described, though I do not consider it so effective.

It will be seen from this description that a practical means of relief from excessive pressure is afforded without interfering with the ordinary use and office of the valve.

Having described my invention, what I claim is—

1. In combination with the cylinder and steam-chest of an engine, a valve composed of two parts normally in contact and operating as one valve, but capable of being separated by pressure, substantially as described, and for the purpose set forth.

2. In combination with the cylinder and steam-chest of an engine, a valve composed of two parts mounted upon a single valve-stem, and normally in contact and operating as one valve, but capable of being separated by pressure, substantially as described, and for the purpose set forth.

3. In combination with the cylinder and steam-chest of an engine, a valve composed of two parts mounted upon a single valve-stem, one part being fixed upon said stem and the other part loose thereon, such parts being held normally in contact to operate as one valve, but capable of being separated by pressure, substantially as described, and for the purpose set forth.

4. In combination with the cylinder and steam-chest of an engine, a valve composed of two parts, one fixed and one loose upon a single stem, a pressure-spring for holding such parts in contact, and an annular space between the two parts communicating with the cylinder, whereby an excess of pressure in the cylinder will cause a separation of the two parts of the valve against the steam and spring pressure, substantially as described, and for the purpose set forth.

5. In combination with the cylinder and steam-chest of an engine, a piston-valve composed of two parts, one fixed and one loose upon a single stem, a spring for holding such parts in contact, an annular space between the two parts, and passages in one of said parts to permit the escape of water after their separation, as hereinbefore described.

6. The combination of the cylinder and steam-chest, the fixed valve-section A, having passages *c*, the loose section B, the spring E, and the annular space or chamber *b* in the valve section A, all substantially as and for the purpose set forth.

In testimony whereof I have affixed my signature in presence of two witnesses.

JOHN WARREN SARGENT.

Witnesses:
EVERETT WARREN,
JAS. H. TORREY.